United States Patent [19]
Allen et al.

[11] Patent Number: 5,253,317
[45] Date of Patent: Oct. 12, 1993

[54] NON-HALOGENATED PLENUM CABLE

[75] Inventors: Richard C. Allen, Liberty; James P. Graf, Richmond, both of Ind.

[73] Assignee: Cooper Industries, Inc., Houston, Tex.

[21] Appl. No.: 795,708

[22] Filed: Nov. 21, 1991

[51] Int. Cl.⁵ .............................. G02B 6/44
[52] U.S. Cl. .................... 385/109; 174/107; 174/110 R; 174/110 SR; 174/121 A
[58] Field of Search ......... 174/110 SR, 110 R, 107, 174/121 A; 385/109

[56] References Cited

U.S. PATENT DOCUMENTS

| | | | |
|---|---|---|---|
| 4,664,472 | 5/1987 | Mayr et al. | 385/109 |
| 4,678,709 | 7/1987 | Tondre et al. | 174/110 R |
| 4,690,997 | 9/1987 | Cella et al. | 528/26 |
| 4,783,578 | 11/1988 | Bodensiek et al. | 174/117 F |
| 4,941,729 | 7/1990 | Hardin et al. | 174/107 X |
| 5,001,304 | 3/1991 | Hardin et al. | 174/107 |
| 5,010,210 | 4/1991 | Sidi et al. | 174/34 |
| 5,024,506 | 6/1991 | Hardin et al. | 385/102 |
| 5,074,640 | 12/1991 | Hardin et al. | 385/109 |

*Primary Examiner*—Morris H. Nimmo
*Attorney, Agent, or Firm*—Laff, Whitesel, Conte & Saret

[57] ABSTRACT

A non-halogenated cable for use in an electronic system having a core which includes a transmission medium, the transmission medium being a metallic or optical fiber conductor having thereon an insulating layer of non-halogenated polyethersulfone polymer composition, and a non-halogenated jacket which enclosed the core and the transmission medium, said non-halogenated jacket being a single layer of insulating material.

7 Claims, 1 Drawing Sheet

NON-HALOGENATED PLENUM CABLE

FIELD OF THE INVENTION

This invention relates to a non-halogenated plenum cable and to its insulating and non-corrosive composition. More particularly, the present invention relates to a non-halogenated plenum cable used in electronic systems and to its non-halogenated flame retardant composition which insulates the plenum cable and which is non-corrosive.

BACKGROUND OF THE INVENTION

Plenum cable is generally used in a building where fire codes require flame retardant cables. Typically, plenum cables are made of flame retardant halogenated materials. While these known plenum cables are effective flame retardants, there are serious problems associated with their use, especially in the case of a fire in the plenum of a building. One such problem is that when these known plenum cables burn, they release corrosive halogenated gases which severely damage the electronic systems or other corrosion sensitive materials which are often located in the plenum of buildings.

To date, there are presently a few plenum cables which utilize non-halogenated materials (U.S. Pat. Nos.: 4,941,729; 5,001,304; and 5,024,506). However, the non-halogenated materials used in these known plenum cables do not comprise the improved composition of non-halogenated materials disclosed herein.

SUMMARY OF THE INVENTION

It is therefore an object of the present invention to provide a non-halogenated plenum cable which has a polyetherimide copolymer jacket and at least one conductor having a non-halogenated insulation cover of a sulfone polymer.

It is another object of the present invention to provide a twisted pair type conductor which has a non-halogenated polyether sulfone insulation cover.

It is a further object of the present invention to provide a non-halogenated plenum cable and composition therefor which is flame-retardant, insulating and non-corrosive.

It is yet another object of the present invention to provide a non-halogenated plenum cable and composition therefore which does not release corrosive halogenated gases upon burning.

Other objects and advantages of the invention will become apparent from the following detailed description taken in conjunction with the drawings.

DETAILED DESCRIPTION OF THE DRAWINGS

Figure 2:
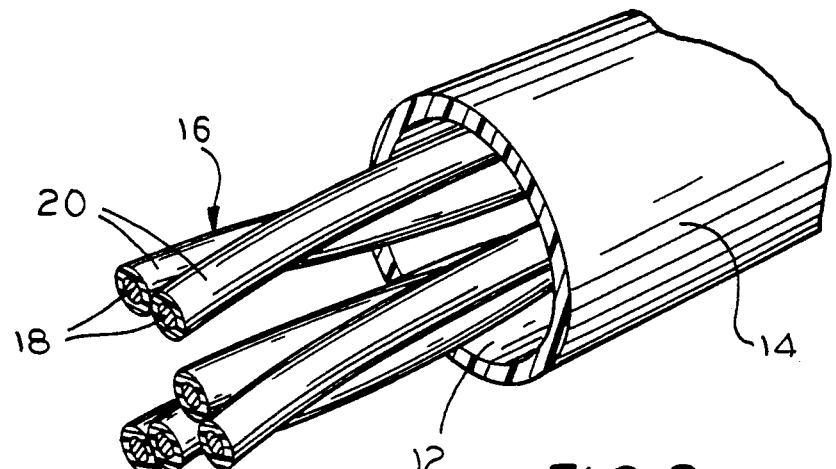
FIG. 2 is a perspective view of the cable of FIG. 1.
Figure 1:
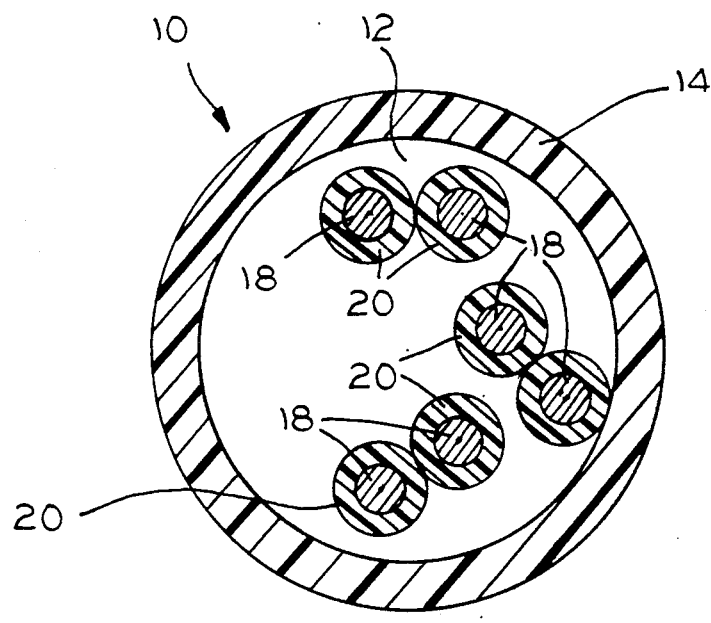
FIG. 1 is an end view of the inventive non-halogenated plenum cable.

Referring to FIGS. 1 and 2, the invention provides a non-halogenated plenum cable and composition therefore for use in buildings and especially in plenums of buildings, which is flame-retardant, insulating and non-corrosive. Specifically, the non-halogenated materials used in the plenum cable herein eliminate the possibility of creating corrosive halogenated gases upon burning and therefore eliminate corrosive damage to electronic systems and other corrosion sensitive materials, especially in the case of a fire in the plenum of a building.

The plenum cable herein is generally denoted by the numeral 10 and includes, in part, a core 12 and a circumferentially extending jacket 14 which envelopes the core. At least one insulated conductor extends through core 12 in a longitudinally parallel relationship to jacket 14.

The transmission medium in the preferred embodiment consists of twisted pairs 16 of insulated metallic conductors 18 which are formed by twisting together two metallic conductors with a mechanical twisting cable (not shown). Each of the metallic conductors 16 generally are made of solid or stranded metallic conducting materials, i.e., copper or tin coated copper and are covered with an insulating material 20 prior to the twisting process. The conductor may be an optical transmission medium, i.e., optical fibers covered with the non-halogenated sulfone polymer.

The insulating material is a non-halogenated sulfone polymer composition. In a preferred embodiment, the insulating material 20 on each conductor 18 is polyethersulfone, which is made by ICI (Imperial Chemical Industries, Ltd., Macclesfield, Cheshire, England) and referred to as ICI Victrex ® polyethersulfone. In the preferred embodiment, ICI Victrex ® polyethersulfone is used for insulating the metallic conductors because of its excellent electrical properties, such as dielectric strength and dielectric constant, and further for its excellent physical properties, such as tensile strength, abrasion resistance and low smoke emission.

The polyethersulfone cover 20 which covers metallic conductors 18 typically has a thickness of about 0.005 to 0.010 inches.

The twisted, polyethersulfone-insulated metallic conductors 18 are housed within core 12 which is also insulated with another insulating material which forms the jacket 14 around core 12 and conductor pairs 16. In the preferred embodiment, jacket 14 is a silicone polyetherimide copolymer sold by G. E. Plastics under the tradename of SILTEM ®. The preferred embodiments utilizes G. E. SILTEM ® silicone polyetherimide copolymer in the jacket because of its good physical properties, such as tensile strength, percent elongation, flame retardancy and low smoke emission.

SILTEM ® is described as a non-halogenated thermoplastic silicone-polyimide copolymer of siloxane and etherimide. It has a tensile strength of 4000 psi, a gardner impact of 120 inch pounds, and an oxygen index of 46.

The silicone polyetherimide copolymer jacket 14 typically has a thickness of about 0.010 to 0.030 inches.

Therefore, it should be recognized that, while the invention has been described in relation to a preferred embodiment, those skilled in the art may develop a wide variation of structural details without departing from the principles of the invention. Therefore, the appended claims are to be construed to cover all equivalents falling within the true scope and spirit of the invention.

I claim:

1. A non-halogenated cable for use in an electronic system comprising a core which comprises a transmission medium, said transmission medium being a metallic or optical fiber conductor having in contact with said metallic or optical fiber conductor an insulating layer of non-halogenated polyethersulfone polymer composition, and a non-halogenated jacket which encloses said core and said transmission medium, said non-halogenated jacket being a single layer of insulating material.

2. The cable of claim 1 wherein said insulating material of said non-halogenated jacket is a silicone-polyetherimide copolymer.

3. The cable of claim 2 wherein said polyethersulfone polymer insulating layer has a thickness of from about 0.005 to about 0.010 inches.

4. The cable of claim 2 wherein said silicone-polyetherimide copolymer jacket has a thickness of from about 0.010 to 0.030 inches.

5. A non-halogenated insulated conductor for use in a cable core, said insulated conductor having a transmission medium, said transmission medium being a metallic or optical fiber conductor and an insulating layer of non-halogenated polyether sulfone polymer in contact with said metallic or optical fiber conductor.

6. The conductor of claim 5 wherein the conductor is a metallic conductor for a twisted pair transmission medium.

7. The conductor of claim 5 wherein said polyethersulfone has a thickness of from about 0.005 to about 0.010 inches.

* * * * *